United States Patent [19]

Atago et al.

[11] Patent Number: 4,462,378
[45] Date of Patent: Jul. 31, 1984

[54] CONTROL APPARATUS FOR AN INTERNAL COMBUSTION ENGINE HAVING A CARBURETOR

[75] Inventors: Takeshi Atago, Katsuta; Yasunori Mouri, Katsuta; Tokuo Kosuge, Katsuta; Toshio Furuhashi, Ibaraki; Osamu Abe, Katsuta; Taiji Hasegawa, Nakaminato, all of Japan

[73] Assignee: Hitachi, Ltd., Tokyo, Japan

[21] Appl. No.: 532,524

[22] Filed: Sep. 15, 1983

Related U.S. Application Data

[62] Division of Ser. No. 110,469, Jan. 8, 1980.

[30] Foreign Application Priority Data

Jan. 16, 1979 [JP] Japan .................................. 54-2195

[51] Int. Cl.³ ............................................. F02M 25/06
[52] U.S. Cl. ..................................... 123/571; 123/440
[58] Field of Search ........................ 123/568, 571, 440

[56] References Cited

U.S. PATENT DOCUMENTS 4,142,493 3/1979 Schira et al. ....................... 123/571

Primary Examiner—Tony M. Argenbright
Attorney, Agent, or Firm—Antonelli, Terry & Wands

[57] ABSTRACT

An apparatus for controlling the operation of an internal combustion engine having a carburetor, especially, the air-fuel ratio and the rate of exhaust gas recirculation, controls the air-fuel ratio of the air-fuel mixture supplied to the engine in the steady operating condition of the engine on the basis of predetermined data determined relative to the engine crankshaft rotation speed and intake vacuum and stored previously in a memory. A three-way catalyst is used to purify engine exhaust gases, and an output signal from an $O_2$ sensor in the exhaust system is fed back for the control of the air-fuel ratio in the engine exhaust gases. A circuit is provided to check whether this feedback control is normally carried or not. The air-fuel ratio of the air-fuel mixture supplied to the engine in an unsteady operating condition of the engine is controlled by regulating the amounts of fuel and air supplied to the engine while bypassing the carburetor, on the basis of the sensed values of the intake vacuum, engine crankshaft rotation speed and engine temperature and also depending on the throttle valve position. For the control of the rate of exhaust gas recirculation, an upper limit and a lower limit of the rate of opening of a recirculation rate regulating valve are determined on the basis of the sensed throttle valve opening, and other predetermined data determined relative to the engine crankshaft rotation speed and intake vacuum is read out from the memory to limit the rate of opening of the recirculation rate regulating valve.

4 Claims, 19 Drawing Figures

CONTROL APPARATUS FOR AN INTERNAL COMBUSTION ENGINE HAVING A CARBURETOR

This is a division of application Ser. No. 110,469 filed Jan. 8, 1980.

FIELD OF THE INVENTION

This invention relates to the control of an internal combustion engine having a carburetor, and more particularly to a control apparatus having the functions of controlling the air-fuel ratio of the air-fuel mixture supplied to such an engine, controlling the rate of exhaust gas recirculation in the engine, and varying the air-fuel ratio as required for the purpose of checking whether a feedback control based on a gas sensor output is normally carried out or not.

BACKGROUND OF THE INVENTION

In an internal combustion engine having a carburetor mounted in an automotive vehicle, the amount of air and fuel supplied to the engine must be accurately controlled depending on operating conditions of the engine in order to maintain a proper matching relationship therebetween, so as to effectively purify exhaust gases from the engine and to operate the engine at the highest possible efficiency at all times.

A three-way catalyst is commonly used for the desired purification of exhaust gases from an engine of this type. In such an engine, the output signal from a gas sensor, for example, an $O_2$ sensor disposed in the exhaust system, is fed back to control the air-fuel ratio of the air-fuel mixture supplied to the engine so as to maintain it at the value of 14.7 which is the stoichiometric air-fuel ratio. However, this air-fuel ratio of 14.7 is not always optimum from the viewpoint of efficiency of engine operation and also from the viewpoint of fuel consumption. Therefore, in order to ensure the highest possible efficiency of engine operation and the lowest possible fuel consumption in the engine, it is necessary to control the air-fuel ratio rather than only the feedback control based on the output signal from the $O_2$ sensor, while, at the same time, carrying out the desired purification of engine exhaust gases.

An electronically controlled carburetor for an internal combustion engine having a carburetor is proposed in, for example, Japanese Patent Applicaion Laid-open No. 50126/73, in which a computer is employed to arithmetrically calculate the air-fuel ratio on the basis of the variables of operating conditions of the engine so as to control the air-fuel ratio. In the proposed electronically controlled carburetor, a solenoid-operated valve is disposed in the fuel system leading to the carburetor, and the computer makes necessary calculations on the basis of the sensed variables of the operation conditions of the engine to control the valve, thereby suitably modifying the air-fuel ratio as determined by the setting of the carburetor. While this electronic control of the air-fuel ratio is effective, it is now necessary to attain the desired air-fuel ratio control in a simpler and more accurate manner than hitherto, as the capacity of modern memory elements becomes larger and larger.

On the other hand, it is necessary to appropriately control the rate of exhaust gas recirculation depending on the operating conditions of the engine, so that exhaust gases from the engine can be efficiently purified, by way of exhaust gas recirculation, which is one of the measures employed for the purification of engine exhaust gases.

SUMMARY OF THE INVENTION

It is a primary object of the present invention to provide a novel and improved control apparatus for an internal combustion engine having a carburetor, which is capable of simply and accurately controlling the air-fuel ratio.

In an embodiment of the present invention, there is provided an apparatus by which the rate of exhaust gas recirculation can also be simply and accurately controlled depending on operating conditions of the engine.

In the present invention, a plurality of predetermined data in accordance with the variables of the operating conditions of the engine are mapped and previously stored in a memory element. In the steady operating condition in which the rotation speed of the engine is maintained constant, a suitable one of the stored data is read out from the memory element for suitably modifying the air-fuel ratio determined by the setting of the carburetor. In an unsteady operating condition in which the engine is being started, warmed up, accelerated, decelerated or idling, the desired air-fuel ratio widely differs in accordance with the vacuum in the intake pipe, the rotation speed of the engine, the temperature of the engine and other factors in such operating condition. It is therefore very difficult to previously determine and use the aforementioned predetermined data for the modification of the air-fuel ratio. In the case of the unsteady operating condition of the engine, therefore, the amounts of air and fuel supplied to the engine, while bypassing the carburetor, are controlled depending on the operating conditions of the engine, thereby suitably modifying the air-fuel ratio determined by the setting of the carburetor.

For the purpose of the exhaust gas recirculation rate control in an embodiment of the present invention, a plurality of predetermined data in accordance with the variables of the operating conditions of the engine are also mapped to be previously stored in the memory element, and a suitable one of the stored data is read out from the memory element to control the rate of exhaust gas recirculation.

An apparatus, in which a plurality of predetermined data related to the variables of the operating conditions of an engine is stored in a memory and the operation of the engine is controlled on the basis of the stored data, is disclosed in, for example, U.S. Pat. No. 3,689,755. However, this U.S. patent does not describe whatsoever as to how the air-fuel ratio and/or the rate of exhaust gas recirculation are controlled on the basis of the stored data in an internal combustion engine having a carburetor.

The predetermined data corresponding to the steady operating condition of the engine and stored previously in the memory element will become useless when a temporal variation occurs in the operating characteristic of the carburetor or when a temporal deterioration occurs in the performance of the engine. In such a case, therefore, it may become necessary to rely upon a sensor sensing the concentration of one of the components of engine exhaust gases purified by, for example, a three-way catalyst and to feed back the sensor an output signal indicative of the result of sensing for the control of the air-fuel ratio. In an embodiment of the present invention, there is also provided an apparatus for checking as to whether this feedback control is normally carried out or not.

According to one aspect of the present invention, there is provided an apparatus for controlling an internal combustion engine having a carburetor including an intake pipe, an exhaust pipe, a low speed fuel system and a high-medium speed fuel system, the control apparatus comprising a plurality of sensor means for sensing a plurality of variables of the engine operating conditions and generating a plurality of output signals indicative of the sensed variables respectively, at least one electronic memory means for storing predetermined data related to the variables of the engine operating conditions, a slow solenoid-operated valve and a main solenoid-operated valve associated with the low speed fuel system and the high-medium speed fuel system, respectively, the rate of opening of each of the slow solenoid-operated valve and the main solenoid-operated valve being controlled on the basis of the predetermined data corresponding to the sensed variables of the engine operating condition so as to control the air-fuel ratio of the air-fuel mixture supplied to the engine by way of the low speed fuel system or the high-medium speed fuel system according to engine operating conditions.

According to another aspect of the present invention, there is provided an apparatus for controlling an internal combustion engine having a carburetor including at least an intake pipe, an exhaust pipe, a low speed fuel system and a high-medium speed fuel system, the control apparatus comprising a plurality of sensor means for sensing a plurality of variables of engine operating conditions and generating a plurality of output signals indicative of the sensed variables respectively, at least one electronic memory means for storing predetermined data related to the variables of the engine operating conditions, and a slow solenoid-operated valve and a main solenoid-operated valve associated with the low speed fuel system and the high-medium speed fuel system respectively, the rate of opening of each of the slow solenoid-operated valve and the main solenoid-operated valve being controlled on the basis of the predetermined data corresponding to the sensed variables of the engine operating conditions so as to control the air-fuel ratio of the air-fuel mixture supplied to the engine by way of the low speed fuel system or the high-medium speed fuel system according to the engine operating conditions, wherein the control apparatus further comprises additional sensor means for sensing the concentration of a component of exhaust gases from the engine, and feedback control means for modifying the rate of opening of the slow solenoid-operated valve or the main solenoid-operated valve depending on the level of the output signal from the additional sensor means.

According to still another aspect of the present invention, there is provided an apparatus for controlling an internal combustion engine having a carburetor including at least an intake pipe, an exhaust pipe, a low speed fuel system and a high-medium speed fuel system, the control apparatus comprising a plurality of sensor means for sensing a plurality of variables of the engine operating conditions and generating a plurality of output signals indicative of the sensed variables, respectively, at least one electronic memory means for storing predetermined data related to the variables of the engine operating conditions, and a slow solenoid-operated valve and a main solenoid-operated valve associated with the low speed fuel system and the high-medium speed fuel system respectively, the rate of opening of each of the slow solenoid-operated valve and the main solenoid-operated valve being controlled on the basis of the predetermined data corresponding to the sensed variables of the engine operating conditions, so as to control the air-fuel ratio of the air-fuel mixture supplied to the engine by way of the low speed fuel system or the high-medium speed fuel system according to the engine operating conditions, wherein the control apparatus further comprises additional fuel supplying means for supplying fuel to the engine while bypassing the carburetor, additional air supplying means for supplying air to be mixed with fuel supplied by the additional fuel supplying means, fuel regulating means for regulating the amount of fuel supplied by the additional fuel supplying means, and air regulating means for regulating the amount of air supplied by the additional air supplying means.

According to yet another aspect of the present invention, there is provided an apparatus for controlling an internal combustion engine having a carburetor including at least an intake pipe, an exhaust pipe, a low speed fuel system and a high-medium speed fuel system, the control apparatus comprising a plurality of sensor means for sensing a plurality of variables of the engine operating conditions and generating a plurality of output signals indicative of the sensed variables respectively, at least one electronic memory means for storing predetermined data related to the variables of the engine operating conditions, and a slow solenoid-operated valve and a main solenoid-operated valve associated with the low speed fuel system and the high-medium speed fuel system respectively, the rate of opening of each of the slow solenoid-operated valve and the main solenoid-operated valve being controlled on the basis of the predetermined data corresponding to the sensed variables of the engine operating conditions, so as to control the air-fuel ratio of the air-fuel mixture supplied to the engine by way of the low speed fuel system or the high-medium speed fuel system according to the engine operating conditions. The engine further includes a passage for recirculating engine exhaust gases from the exhaust pipe to the intake pipe, and a recirculation rate regulating valve whose rate of opening is controlled to regulate the rate of exhaust gas recirculation, and the control apparatus further comprises recirculation control means for controlling the rate of opening of the recirculation rate regulating valve, the memory means further storing other predetermined data related to the variables of the engine operating condition in addition to the predetermined data used for the control of the air-fuel ratio of the air-fuel mixture supplied to the engine by way of the low speed fuel system or the high-medium speed fuel system, the recirculation control means controlling the rate of opening of the recirculation rate regulating valve on the basis of the other predetermined data selected as a result of sensing the engine operating conditions.

BRIEF DESCRIPTION OF THE DRAWINGS

Preferred embodiments of the present invention will now be described in detail with reference to the accompanying drawings, in which.

DETAILED DESCRIPTION

Figure 1:
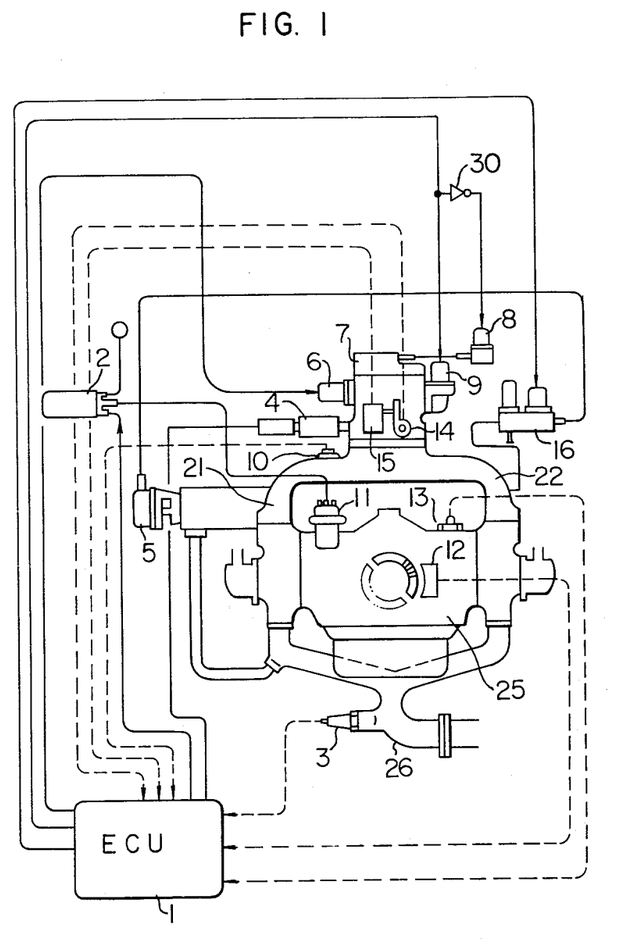
FIG. 1 is a diagrammatic view of an embodiment of the control apparatus of the present invention for controlling an internal combustion engine having a carburetor.

Referring now to FIG. 1, an internal combustion engine 25 having a carburetor 7 includes an intake pipe 22 and an exhaust pipe 26, and carburetor 7 is mounted on the intake pipe 22. The carburetor 7 is provided with a slow solenoid-operated valve 8 for controlling the air-fuel ratio (abbreviated hereinafter as the A/F ratio) of the air-fuel mixture supplied by way of a low speed fuel system and is also provided with a main solenoid-operated valve 9 for controlling the A/F ratio of the air-fuel mixture supplied by way of a high-medium speed fuel system. When these solenoid-operated valves 8 and 9 are not energized and do not participate in the control of the A/F ratio, the A/F ratio is determined by the setting of the carburetor 7 (which will be referred to hereinafter as the A/F ratio peculiar to the carburetor) so as to be variable within a predetermined range depending on the value of vacuum in the intake pipe 22. As shown in detail in FIG. 3, the carburetor 7 includes a bypass passage for supplying air and fuel to a point downstream of the throttle valve while bypassing the carburetor 7, and an air bypass control solenoid-operated valve 4 and a fuel bypass control solenoid-operated valve 6 for controlling the amounts of air and fuel respectively flowing through this bypass passage are associated with this bypass passage. A throttle sensor 15 for sensing the opening of the throttle valve is associated with the carburetor 7, and this throttle sensor 15 is connected to a throttle switch 14 generating an electrical output signal at a specific opening of the throttle valve.

The intake pipe 22 is provided with a vacuum sensor 10 for measuring the vacuum therein. An EGR valve 5 is provided for controlling the amount or rate of exhaust gas recirculation, and this EGR valve 5 is actuated by a pressure control valve 16. After the vacuum in the intake pipe 22 is regulated at a predetermined value, the pressure control valve 16 actuates the EGR valve 5 by applying thereto a pressure signal corresponding to an electrical signal applied from an electronic control unit 1 which will be abbreviated hereinafter as an ECU. The operation of the EGR valve 5 determines the amount or rate of exhaust gas recirculation.

The engine 25 is provided with a temperature sensor 13 which senses the temperature of engine cooling water, hence, the temperature of the engine 25 (hereinafter, the engine cooling water temperature is called the engine temperature). This temperature sensor 13 generates an electrical output signal indicative of the sensed temperature of the engine 25. A rotation sensor 12 is associated with the crankshaft (not shown) of the engine 25 to generate a pulse signal synchronous with the combustion cycle in the engine 25 and a pulse signal indicative of the rotation speed of the engine 25. The rotation speed signal generated from this rotation sensor 12 includes generally a train of 180 pulses appearing during each complete revolution of the crankshaft. An $O_2$ sensor 3 is provided in the exhaust pipe 26 to sense the oxygen concentration in combustion gases exhausted from the engine 25 and thereby generating an electrical output signal indicative of the A/F ratio in the engine exhaust gases. As is well known, the level of the output signal from this $O_2$ sensor 3 varies sharply stepwise at the value of the so-called stoichiometric A/F ratio.

The output signals from the vacuum sensor 10, rotation sensor 12, temperature sensor 13, throttle switch 14, throttle sensor 15 and $O_2$ sensor 3 are applied to the ECU 1, and on the basis of these input signals, the ECU 1 applies control signals to the slow solenoid-operated valve 8, main solenoid-operated valve 9, air bypass control solenoid-operated valve 4, fuel bypass control solenoid-operated valve 6 and pressure control valve 16. Although, not directly concerned with the present invention, the engine 25 is provided with a distributor 11 and an ignition coil 2 for controlling the ignition timing in response to an output signal from the ECU 1.

Figure 2:
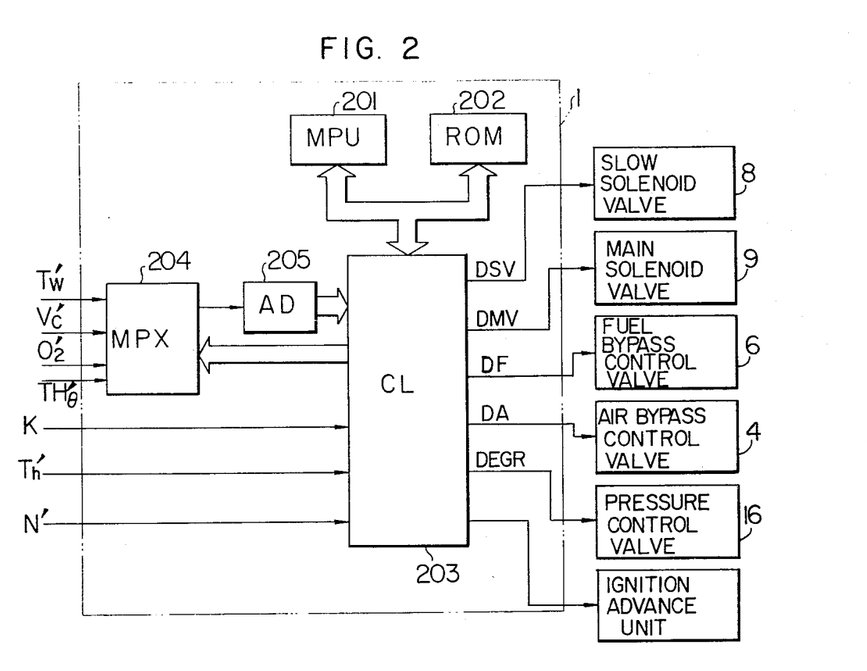
FIG. 2 is a block diagram of part of the embodiment of the present invention shown in FIG. 1.

FIG. 2 is a block diagram of part of the control apparatus shown in FIG. 1. Referring to FIG. 2, the ECU 1 includes a microprocessing unit 201 (referred to hereinafter as an MPU), a memory element 202 (referred to hereinafter as a ROM) for storing control programs and predetermined data or constants, and a control logic circuit 203 (referred to hereinafter as a CL), and the MPU 201, ROM 202 and CL 203 are interconnected by address buses, data buses and control lines. The ECU 1 further includes a multiplexer 204 (referred to hereinafter as an MPX), and an analog-digital converter 205 (referred to hereinafter as an AD), and analog output signals Vc', Tw', O$_2$' and TH$_\theta$' appearing from the vacuum sensor 10, temperature sensor 13, O$_2$ sensor 3 and throttle sensor 15 respectively are applied to the MPX 204. The MPX 204 selects sequentially these signals in response to selection signals applied sequentially from the CL 203 under control of the MPU 201. The selected analog signals are sequentially applied to the AD 205 to be converted into corresponding digital signals which are applied to the CL 203. Digital output signals N' and Th' appearing from the rotation sensor 12 and throttle switch 14 respectively are directly applied to the CL 203. An engine starting key switch (not shown) generates a signal K, so that various kinds of control can be started in response to the application of this signal K to the CL 203. On the basis of these input signals, the ECU 1 generates a drive signal DSV for driving the slow solenoid-operated valve 8, a drive signal DMV for driving the main solenoid-operated valve 9, a drive signal DF for driving the fuel bypass control solenoid-operated valve 6, a drive signal DA for driving the air bypass control solenoid-operated valve 4, and drive signal DEGR for driving the pressure control valve 16. These drive signals have rectangular waveforms, except the air valve drive signal DA, and the duty ratio t/T (where T is the period and t is the signal duration) of each of these signals is varied to control the operation of the associated valve.

Figure 3:
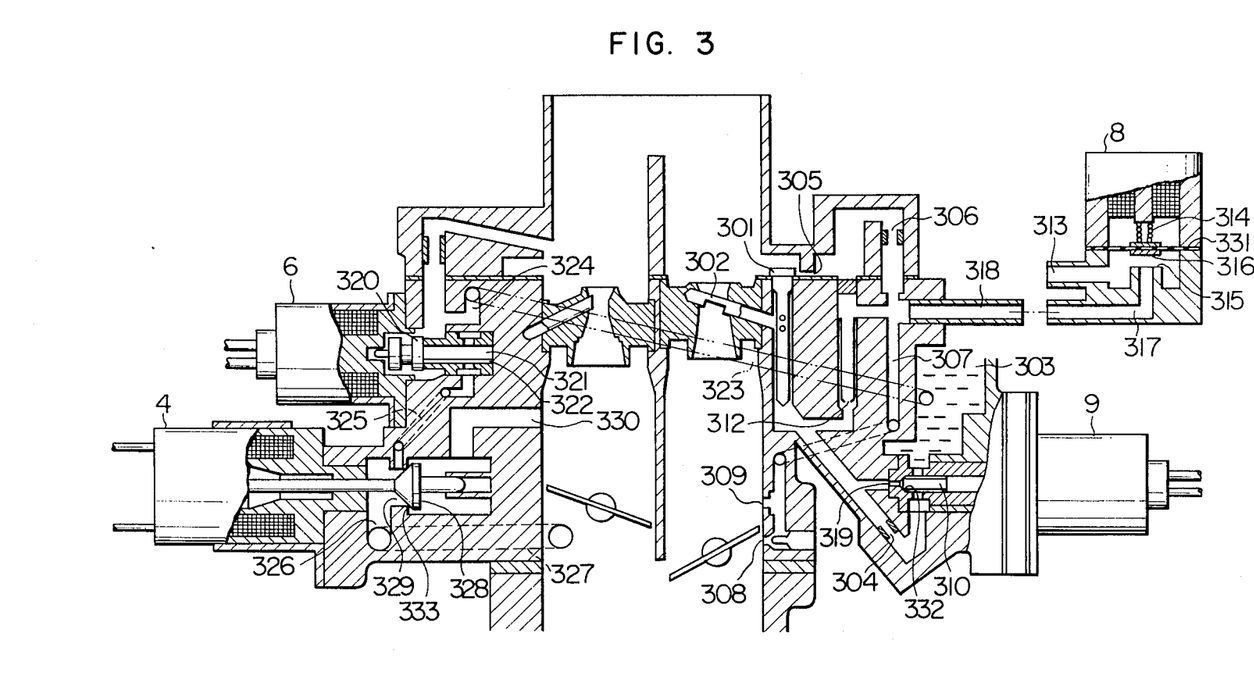
FIG. 3 is a longitudinal sectional view of one form of the carburetor employed in the embodiment of the present invention shown in FIG. 1.

FIG. 3 is a longitudinal sectional view of one form of the carburetor 7 preferably employed in the present invention. The illustrated carburetor 7 is of a type commonly called a two-barrel type. Referring to FIG. 3, a high-medium speed fuel system in the primary barrel includes an air passage leading from the inlet of the carburetor 7 to a venturi through an air jet 301 and a main nozzle 302, and a fuel passage leading from a float chamber 303 to the main nozzle 302 through a main jet 304 and the peripheral gap of the air jet 301. A fuel system similar to that above described is also provided in the secondary barrel. A low speed fuel system includes an air passage leading from the inlet of the carburetor 7 to a vacuum port 308 and an idle port 309 through a passage 305, an air bleed 306 and another passage 307, and a fuel system leading from the float chamber 303 to the passage 307 through the peripheral gap of a valve member 310 of the main solenoid-operated valve 9, the main jet 304 and a slow jet 312. The slow solenoid-operated valve 8 includes an air inlet 313 connected to the air cleaner, and a valve member 316 normally pressed against a valve seat 315 by a compression spring 314 and urged away from the valve seat 315 in response to the energization of the solenoid. The valve member 316 is supported by a diaphragm 331. A passage 317 communicates with the passage 307 through a passage 318. A drive signal DSV of rectangular waveform is applied to the solenoid of the slow solenoid-operated valve 8 from the ECU 1. By varying the duty ratio t/T of this drive signal DSV, the duration in which the valve member 316 is urged away from the valve seat 315, that is, the rate of opening of the slow solenoid-operated valve 8 is varied to modify the A/F ratio of the air-fuel mixture supplied by way of the low speed fuel system. When the solenoid of the main solenoid-operated valve 9 is energized, the valve member 310 is urged away from a valve seat 332 having an axial bore 319 to increase the amount of fuel flowing through this bore 319. The drive signal DMV of rectangular waveform is applied from the ECU 1 to the solenoid of the main solenoid-operated valve 9. By varying the duty ratio t/T of this drive signal DMV, the duration in which the valve member 310 is urged away from the valve seat 332, that is, the rate of opening of the main solenoid-operated valve 9 is varied to modify the A/F ratio of the air-fuel mixture supplied by way of the high-medium fuel system.

Figure 4:
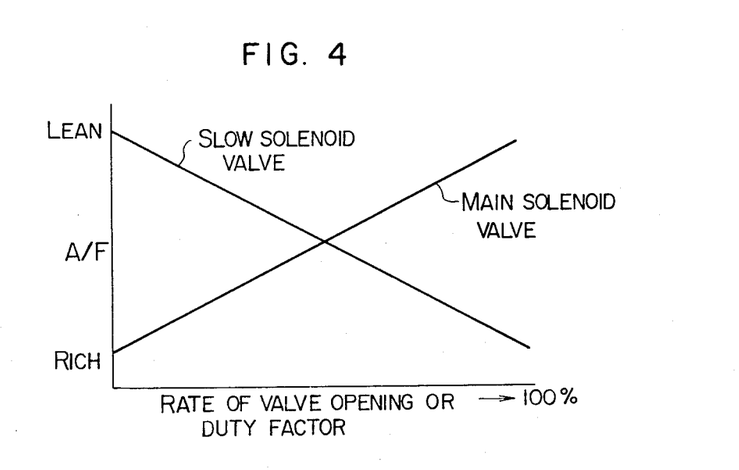
FIG. 4 is a graph showing the air-fuel ratio variable relative to the rate of opening of the slow solenoid-operated valve and that of the main solenoid-operated valve shown in FIG. 3.
Figure 5:
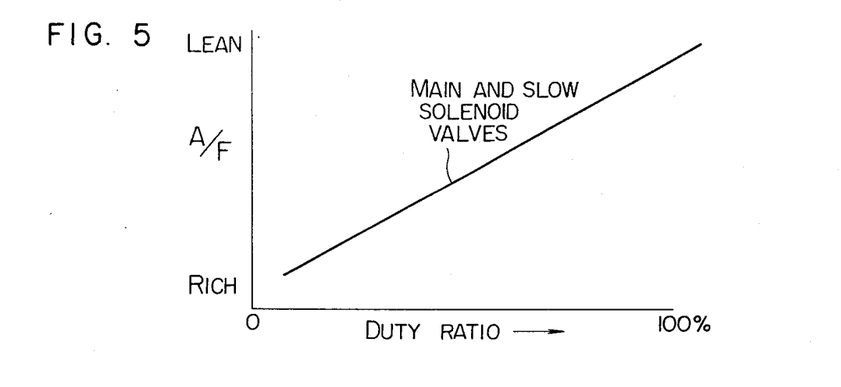
FIG. 5 is a graph showing the relationship between the air-fuel ratio and the duty ratio of the drive signal when driving the slow solenoid-operated valve by an inverted signal of the drive signal driving the main solenoid-operated valve.

FIG. 4 is a graph showing variations in the A/F ratio of the air-fuel mixture supplied to the engine, relative to the rate of opening of the slow solenoid-operated valve 8 and the main solenoid-operated valve 9. In FIG. 4, the horizontal and vertical axes represent the rate of opening of the valves 8 and 9 and the A/F ratio respectively, and it is assumed that the rotation speed of the engine 25 and the vacuum in the intake pipe 22 are maintained constant. Since the rate of opening of each of these valves 8 and 9 is determined by the duty ratio t/T of the drive signal applied thereto, the horizontal axis may represent the duty ratio t/T of the drive signal. Although the drive signals DSV and DMV may be independent of each other, the drive signal DSV may be provided by inverting the drive signal DMV by an inverter 30 shown in FIG. 1. In such a case, the A/F ratio of the air-fuel mixture supplied to the engine 25 will vary relative to the duty ratio t/T of each of the drive signals DMV and DSV in a manner as shown in FIG. 5. Herein, the reference rate of valve opening is set at, for example, 50% for each of the slow solenoid-operated valve 8 and the main solenoid-operated valve 9. The rate of opening of each of these valves 8 and 9 increases or decreases relative to this reference rate of opening, thereby suitably modifying the A/F ratio of the air-fuel mixture supplied to the engine 25. Thus, the aforementioned A/F ratio peculiar to the carburetor designates such an A/F ratio which is determined by another setting of the carburetor 7 when the rate of opening of each of the slow solenoid-operated valve 9 is set at the specified reference rate of opening.

Returning to FIG. 3, the fuel bypass control solenoid-operated valve 6 includes a valve member 320 which is urged leftward in FIG. 3 or away from a stationary member 321 in response to the energization of the solenoid. This stationary member 321 is substantially triangular in its cross-sectional shape and defines a gap between it and the inside wall surface of an axial bore 322 in which it is disposed. The drive signal DF of rectangular waveform is applied from the ECU 1 to the solenoid of the fuel bypass control solenoid-operated valve 6. By varying the duty ratio t/T of this drive signal DF, the duration in which the valve member 320 is urged away from the stationary member 321, that is, the rate of opening of this solenoid-operated valve 6 is varied to regulate the amount of fuel supplied from the float chamber 303 to the engine 25 through passages 323 and 324, thence, through the above gap and passage 325, 326 and 327, thereby modifying the A/F ratio of the air-fuel mixture supplied to the engine 25.

Figure 6:
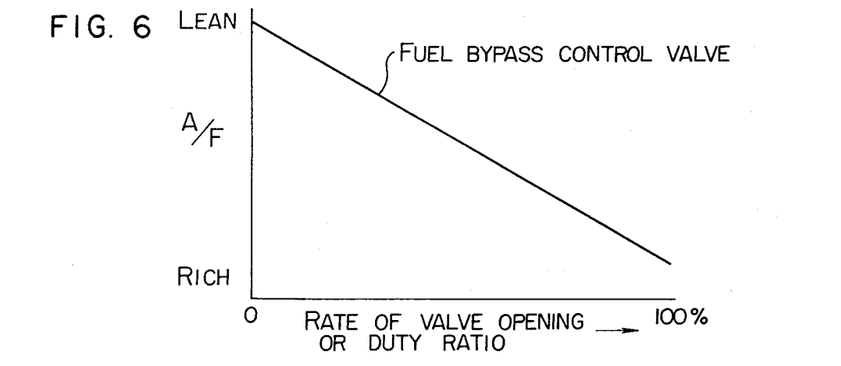
FIG. 6 is a graph showing the relationship between the air-fuel ratio and the rate of opening of the fuel bypass control solenoid-operated valve shown in FIG. 3.

FIG. 6 is a graph showing variations in the A/F ratio of the air-fuel mixture supplied to the engine 25, relative to the rate of opening of the fuel bypass control solenoid-operated valve 6. In FIG. 6, the horizontal and vertical axes represent the rate of valve openign and the A/F ratio respectively. The horizontal axis may represent the duty ratio t/T of the drive signal DF since the rate of valve opening is determined by this duty ratio t/T. The operation of the fuel bypass control solenoid-operated valve 6 is the same as those of the slow solenoid-operated valve 8 and main solenoid-operated valve 9. However, the variable range of the A/F ratio varied under control of this solenoid-operated valve 6 is wider than the variable range of the A/F ratio varied under control of the solenoid-operated valves 8 and 9. The A/F ratio controlled by the solenoid-operated valve 6 is variable, for example, between an A/F ratio=3 and an A/F ratio=20, that is, the variable range of the A/F ratio is about 12-17, in the state where the valve is closed, whereas the A/F ratio controlled by the solenoid-operated valves 8 and 9 is generally variable, for example, between an A/F ratio=11.7 and an A/F ratio=17.7, that is, the variable range of the A/F ratio is about 6. The fuel bypass control solenoid-operated valve 6 is designed to modify the A/F ratio within a range of 1 to 5 when the rate of valve opening, that is, the duty ratio t/T of the drive signal DF is 100%.

Figure 7:
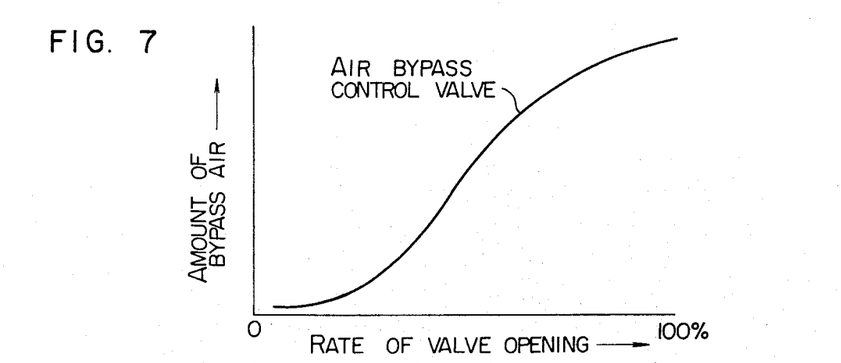
FIG. 7 is a graph showing the operating characteristic of the air bypass control solenoid-operated valve shown in FIG. 3.

Referring to FIG. 3 again, the air bypass control solenoid-operated valve 4 includes a valve member 328 which is urged rightward in FIG. 3 or away from a valve seat 333 having a central opening 329 in response to the energization of the solenoid. This valve 4 is generally in the form of a proportional solenoid-operated valve, and the moving stroke of the valve member 328, hence, the rate or area of valve opening is determined by the current value of the drive signal DA applied from the ECU 1 so as to regulate the amount of air flowing through the passage 330, the opening 329 and the passages 326 and 327. The air bypass control solenoid-operated valve 4 is in no way limited to the proportional solenoid-operated valve illustrated in FIG. 3, and it may be replaced by a vacuum actuated valve actuated by a vacuum signal proportional to such an electrical signal as that described later with reference to the EGR valve 5. FIG. 7 shows variations in the amount of supplied air relative to the rate of opening of this valve 4. The vertical axis in FIG. 7 may represent the rotation speed of the engine 25 since the engine rotation speed increases with the increase in the amount of supplied air.

Figure 8:
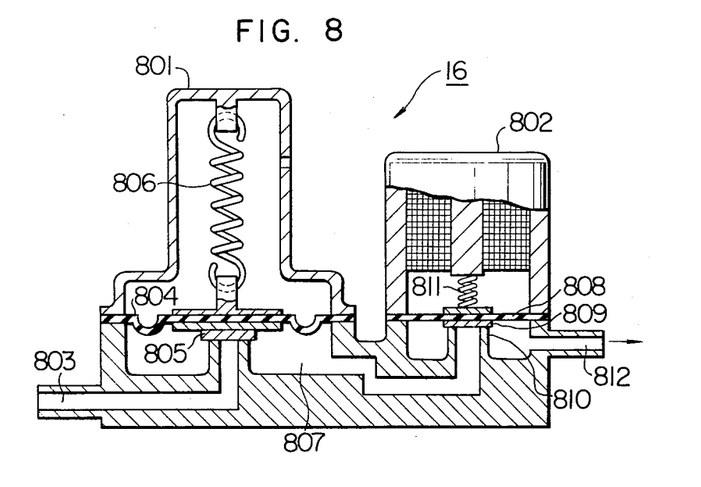
FIG. 8 is a longitudinal sectional view of the pressure control valve shown in FIG. 1.

FIG. 8 is a longitudinal sectional view of the pressure control valve 16. Referring to FIG. 8, the pressure control valve 16 includes a vacuum regulator 801 and a solenoid-operated valve 802. The vacuum regulator 801 includes a passage 803 communicating with the intake pipe 22, a valve member 805 supported by a diaphragm 804, and a tension spring 806, so that the vacuum within a chamber 807 can be maintained constant due to the balance between the vacuum in the intake pipe 22 and the force of the tension spring 806. The structure of the solenoid-operated valve 802 is generally similar to that of the slow solenoid-operated valve 8, and this valve 802 includes a valve member 809 supported by a diaphragm 808, a compression spring 811 normally urging the valve member 809 toward a valve seat 810, and a passage 812 communicating with the EGR valve 5. In response to the energization of the solenoid of the solenoid-operated valve 802, the valve member 809 is urged away from the valve seat 810 against the force of the compression spring 811. The drive signal DEGR of rectangular waveform is applied from the ECU 1 to the solenoid of the solenoid-operated valve 802, and the value of vacuum supplied to the EGR valve 5 is controlled depending on the duty ratio t/T of this drive signal DEGR.

Figure 9:
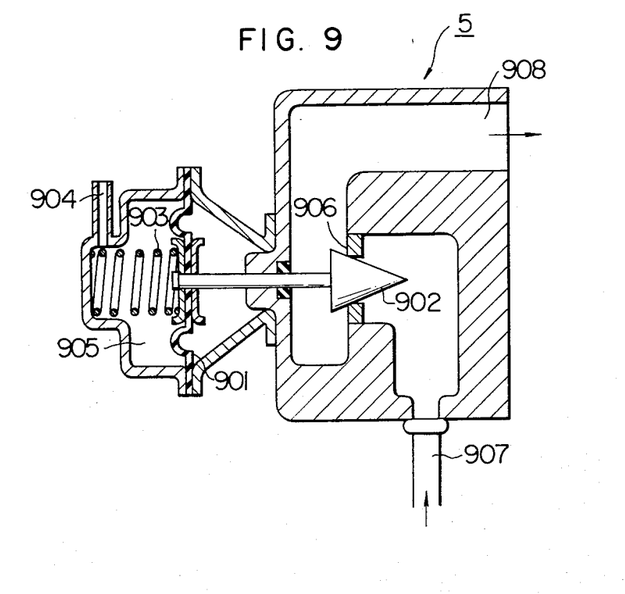
FIG. 9 is a longitudinal sectional view of the EGR (exhaust gas recirculation) valve shown in FIG. 1.

FIG. 9 is a longitudinal sectional view of the EGR valve 5. Referring to FIG. 9, the EGR valve 5 includes a needle valve member 902 supported by a diaphragm 901, and a compressing spring 903 normally urging the needle valve member 902 toward a valve seat 906. A vacuum is supplied from the pressure control valve 16 to a valve chamber 905 by way of a passage 904, and the needle valve member 902 is urged away from the valve seat 906 against the force of the compression spring 903 depending on the value of vacuum supplied by way of the passage 904. A passage 907 communicates with the exhaust pipe 26, and another passage 908 communicates with the intake pipe 22. Therefore, the rate of exhaust gas recirculation from the exhaust pipe 26 to the intake pipe 22 is controlled by the rate of opening of the EGR valve 5. The rate of opening of the EGR valve 5 is determined by the value of vacuum supplied into the valve chamber 905, and this value of vacuum is controlled by the duty ratio t/T of the drive signal DEGR applied from the ECU 1. Thus, the rate of exhaust gas recirculation is controlled by the duty ratio t/T of the drive signal DEGR.

Figure 10:
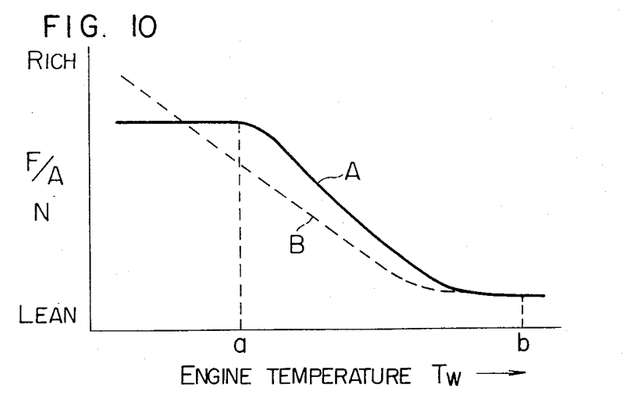
FIG. 10 is a graph showing the relationship between the air-fuel ratio and the rotation speed of the engine relative to the temperature of the engine in the engine warming-up stage.

The Description will next be directed to the control of the A/F ratio during warming-up of the engine in the starting stage, acceleration of the engine, deceleration of the engine and idling of the engine, all of which will be generally called an unsteady operation hereinafter. In the starting stage of the engine 25, the engine 25 is not warm, and warming-up is required. In this stage, the ECU 1 determines a desired rotation speed Ns corresponding to the temperature Tw of the engine 25 sensed by the temperature sensor 13. This desired rotation speed Ns is maintained constant at, for example, 2000 rpm until the engine 25 is warmed up sufficiently to the temperature of, for example, 20° C. (actually, which is the cooling water temperature). The ECU 1 compares the signal indicative of the desired rotation speed Ns with the signal indicative of the actual rotation speed N sensed by the rotation sensor 12 so as to control the rate of opening of the air bypass control solenoid-operated valve 4 on the basis of the error therebetween. The rotation speed N of the engine 25 increases with the increase in the rate of opening of this valve 4. The ECU 1 then calculates the required amount of fuel on the basis of the duty ratio t/T of the air valve drive signal DA and the engine temperature Tw, so as to determine the rate of opening of the fuel bypass control solenoid-operated valve 6. As shown by the solid curve A in FIG. 10, the rotation speed N of the engine 25 is decreased when the temperature Tw of the engine 25 attains a predetermined level a, until finally the rotation speed N becomes equal to the idling rotation speed. The rate of opening of the air bypass control solenoid-operated valve 4 is continuously controlled by the ECU 1 so that the rotation speed N of the engine 25 follows the level of the desired rotation speed Ns at that time. It is necessary to increase the amount of fuel when the temperature Tw of the engine 25 is low, thereby enriching the A/F ratio of the air-fuel mixture supplied to the engine 25. On the other hand, the rate of opening of the solenoid-operated valve 6 is decreased to increase the A/F ratio of the air-fuel mixture supplied to the engine 25 when the temperature Tw of the engine 25 is raised, since it is unnecessary to supply a rich air-fuel mixture in such a case. For example, the A/F ratio is varied from 8 to 14.7. Thus, the temperature Tw of the engine 25 is selected as one of the factors determining the rate of opening of the fuel bypass control solenoid-operated valve 6 so as to control the A/F ratio as a function of the engine temperature Tw as described above. Practically, a table of a plurality of coefficients J(DA) corresponding to a plurality of values respectively of the engine temperature Tw is previously stored in the ROM 202 in the ECU 1, and such coefficients J(DA) are successively read out to be used for the calculation determining the rate of opening of the solenoid-operated valve 6. However, when the A/F ratio is varied as a sole function of the engine temperature Tw in the manner above described, the A/F ratio accurately corresponding to the actual rotation speed N of the engine 25 will not be determined. This is because, when the actual rotation speed N of the engine 25 deviates from the desired rotation speed Ns set by the ECU 1, the corresponding amount of air will be supplied through the air bypass control solenoid-operated valve 4 while bypassing the carburetor 7. It is therefore necessary to use the actual rotation speed N of the engine 25 also as the factor for controlling the rate of opening of the solenoid-operated valve 6. For the purpose of such a manner of control, the drive signal DA driving the air bypass control solenoid-operated valve 4 is employed an another factor for determining the rate of opening of the fuel bypass control solenoid-operated valve 6 as described hereinbefore. The dotted curve B in FIG. 10 represents the A/F ratio determined by controlling this solenoid-operated valve 6 on the basis of the air valve drive signal DA and the engine temperature Tw. It is to be noted that, in FIG. 10, the vertical axis represents the F/A ratio.

The A/F ratio during idling rotation of the engine 25 is also controlled in a manner generally similar to that described with reference to the warming-up of the engine 25. In this case, however, the temperature Tw of the engine 25 is generally high, and the A/F ratio is controlled at, for example, a point b in FIG. 10.

During acceleration of the engine 25, a reference intake vacuum variation (dVc/dt)s set by the ECU 1 is compared with the actual intake vacuum variation dVc/dt calculated on the basis of the intake vacuum signal applied from the vacuum sensor 10. When it is determined that the engine 25 is being accelerated, the data DF' corresponding to the value of (dVc/dt)s for instructing the rate of opening of the fuel bypass control solenoid-operated valve 6 is modified by the value of the coefficient J(DA) corresponding to the engine temperature Tw so as to determine the duty ratio t/T of the drive signal DF driving this solenoid-operated valve 6, and this drive signal DF is applied to determine the rate of opening of the solenoid-operated valve 6 thereby controlling or modifying the A/F ratio.

During deceleration of the engine 25, the result of comparision between (dVc/dt)s and dVc/dt indicates that the engine 25 is not being accelerated. In this case, after detecting full closure of the throttle valve, the actual vacuum Vc in the intake pipe 22 is compared with a reference intake vacuum Vcs. When it is thus determined that the engine 25 is being decelerated, the rate of opening of the air bypass control solenoid-operated valve 4 is so controlled as to establish the relation Vc=Vcs. The amount of fuel to be supplied during the deceleration stage of the engine 25 is controlled in a manner entirely similar to the fuel control described with reference to the warming-up of the engine 25. The function of coasting richer can also be provided since the vacuum in the intake pipe 22 can be controlled at a predetermined value during this deceleration stage of the engine 25.

UNSTEADY STATE OPERATION

The A/F ratio control during the unsteady operating condition of the engine 25 described above will be described with reference to FIG. 11 which is a flow chart of control steps. In step 1101, the temperature Tw of the engine 25 is sensed by the temperature sensor 13 and in step 1102, the desired rotation speed Ns corresponding to the sensed engine temperature Tw is set. In step 1103, the actual rotation speed N of the engine 25 is sensed by the rotation sensor 12, and the vacuum Vc in the intake pipe 22 is sensed by the vacuum sensor 10. In step 1104, the reference intake vacuum variation (dVc/dt)s is set, and in step 1105, this setting (dVc/dt)s is compared with the actual intake vacuum variation dVc/dt to determine whether the engine 25 is being accelerated. When $dVc/dt - (dVc/dt)s < 0$, it is determined that the engine 25 is not being accelerated, and in step 1106, whether the throttle valve is in its fully closed position or not is detected. The throttle switch 14 is turned on to generate its electrical output signal when the throttle valve is fully closed. The full closure of the throttle valve indicates that the engine is being started or decelerated or idling, and, in step 1107, the reference intake vacuum Vcs is set to be compared with the actual intake vacuum Vc in step 1108. When $Vc - Vcs < 0$ (where Vc and Vcs are absolute values of vacuum), it is determined that the engine 25 is being started or idling and is not being decelerated.

START OR IDLE

Figure 11:
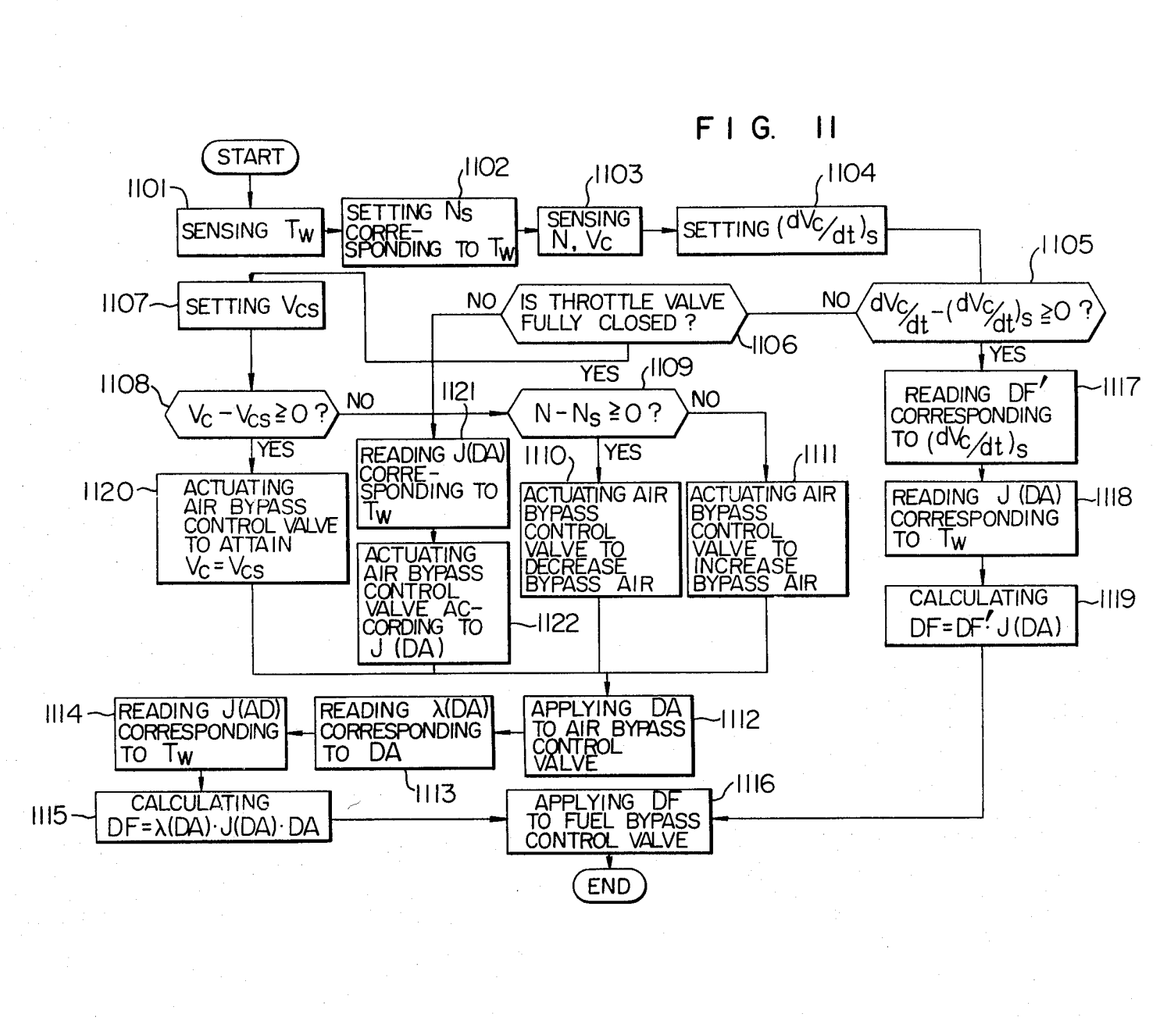
FIG. 11 is a flow chart of the air-fuel ratio control in an unsteady operating condition of the engine.

When it is proved that $Vc - Vcs < 0$ in step 1108, the actual rotation speed N is compared with the desired rotation speed Ns corresponding to the engine temperature Tw in step 1109. Depending on whether $N - Ns < 0$ or $N - Ns \geq 0$, the amount of air supplied through the air bypass control solenoid-operated valve 4 while bypassing the throttle valve is controlled to attain the relationship N=Ns in steps 1110, 1111 and 1112. The data of the air valve drive signal DA for controlling the required amount of bypass air is set in the CL 203.

The amount of bypass fuel to be supplied is controlled in steps 1113, 1114, 1115 and 1116. The ROM 202 in the ECU 1 stores previously a table of a plurality of valve-opening rate instruction data λ(DA) so that the rate of opening of the fuel bypass control solenoid-operated valve 6 can be controlled to provide the A/F ratio=14.7 (λ=1) in conjunction with the rate of opening of the bypass air control solenoid-operated valve 4 driven by the drive signal DA. In step 1113, the valve-opening rate instruction data λ(DA) corresponding to the data of the air valve drive signal DA set in the CL 203 is read out from the table stored in the ROM 202. In step 1114, the coefficient J(DA) corresponding to the sensed engine temperature Tw is read out from the table stored in the ROM 202. For example, this coefficient J(DA) is 1.0 when the temperature Tw of the engine 25 is sufficiently high, 1.4 when the engine temperature Tw is 20° C., and 2.0 when the engine temperature Tw is 10° C. In step 1115, the duty ratio t/T of the drive signal DF for driving the fuel bypass control solenoid-operated valve 6 is calculated according to the equation DF=λ(DA)·J(DA)·DA. In step 1116, this drive signal DF is applied to the solenoid-operated valve 6 to control its rate of opening thereby controlling the amount of bypass fuel. The valve-opening rate instruction data λ(DA) is multiplied by the coefficient J(DA) corresponding to the sensed engine temperature Tw to find the A/F ratio corresponding to the sensed engine temperature Tw, and the multiplied result is then multiplied by the data of the air valve drive signal DA to find the A/F ratio corresponding to the actual rotation speed N of the engine 25 when this rotation speed N deviates from the setting Ns. It is apparent that the rotation speed N of the engine 25 is controlled in the steps 1109 to 1112 in concurrent relation with the A/F ratio control in the present embodiment.

ACCELERATION

When it is determined that dVc/dt−(dVc/dt)s≧0 in step 1105, the engine 25 is being accelerated. Since the engine 25 is being accelerated, the drive signal instruction data DF′ corresponding to the value of (dVc/dt)s is read out from the table previously stored in the ROM 202 in step 1117. Then, in step 1118, the coefficient J(DA) corresponding to the sensed engine temperature Tw is read out from the table stored in the ROM 202. In step 1119, the duty ratio t/T of the drive signal DF for driving the fuel bypass control solenoid-operated valve 6 is calculated according to the equation DF=DF′·J(DA). This drive signal DF is applied to the solenoid-operated valve 6 to control its rate of opening thereby controlling the amount of bypass fuel to be supplied.

DECELERATION

When it is determined that Vc−Vcs≧0 in step 1108, the engine 25 is being decelerated. Since the engine 25 is being decelerated, the rate of opening of the air bypass control solenoid-operated valve 4 is controlled so as to attain the relation Vc=Vcs, in steps 1120 and 1112. The amount of bypass fuel to be supplied in such a case is controlled in steps 1113, 1114 and 1115 in a manner entirely similar to the fuel control carried out when the engine 25 is being started or idling.

When it is determined that the throttle valve is not in its fully closed position in step 1106, the engine 25 is operating in its steady operating condition in which the crank shaft rotates at a constant speed or the engine 25 is being warmed up.

WARMING UP

In such a case, the air bypass control solenoid-operated valve 4 is controlled depending on the sensed engine temperature Tw in steps 1121 and 1122. In this control, the rate of opening of this valve 4 is increased with lower temperatures Tw in a temperature range in which the engine temperature Tw is lower than a predetermined setting, for example, 60° C. The J(DA) is determined to be zero and hence the air bypass control solenoid-operated valve 4 is not controlled when the engine temperature Tw is sufficiently higher than the setting. Therefore, the solenoid-operated valve 4 is kept closed in the steady operating condition in which the engine 25 has been sufficiently warmed up. The amount of bypass fuel supplied in such a case is controlled in steps 1113, 1114 and 1115 in a manner entirely similar to the fuel control carried out when the engine 25 is being started or idling.

STEADY STATE OPERATION

Figure 12:
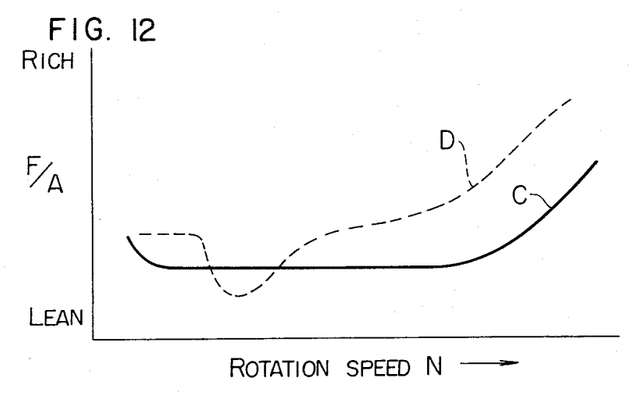
FIG. 12 is a graph showing the relationship between the optimum air-fuel ratio and the air-fuel ratio determined by the setting of the carburetor, relative to the rotation speed of the engine.
Figure 13:
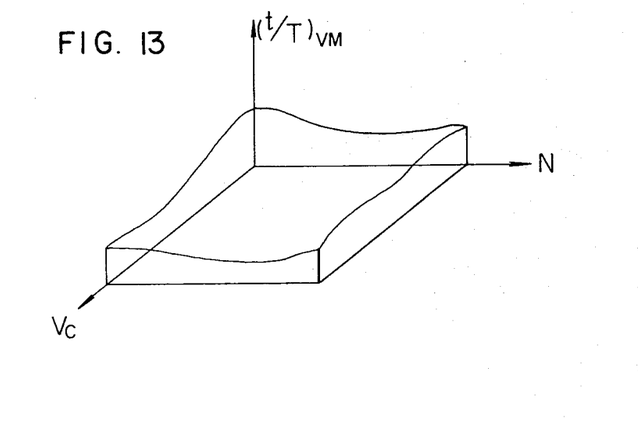
FIG. 13 is an illustration of the mapping of predetermined data indicative of the desired rate of opening of the slow solenoid-operated valve and main solenoid-operated valve, relative to the vacuum in the intake pipe and the rotation speed of the engine.

The description will next be directed to the control of the A/F ratio in the steady operating condition in which the crankshaft of the engine 25 rotates at a constant speed. In this steady operating condition, the A/F ratio of the air-fuel mixture supplied to the engine 25 is desirably maintained at a constant value. An example of this desired value of the A/F ratio in the loaded condition of the engine 25 will be described with reference to FIG. 12. The solid curve C in FIG. 12 represents the desired value of the A/F ratio relative to the rotation speed N of the crankshaft of the engine 25. However, the A/F ratio peculiar to the carburetor 7 varies in a manner as shown by the dotted curve D in FIG. 12. It is to be noted that, in FIG. 12, the vertical axis represents the F/A ratio. The slow solenoid-operated valve 8 and the main solenoid-operated valve 9 act to modify the A/F ratio peculiar to the carburetor 7 represented by the curve D so that it conforms to the curve C representing the desired A/F ratio. For this purpose, the drive signal DSV or DMV is applied to control the rate of opening of the solenoid-operated valve 8 or 9. Although the desired modification of the A/F ratio can be achieved by determining the duty ratio t/T of the drive signal DSV or DMV on the basis of the vacuum Vc in the intake pipe 22 and the crankshaft rotation speed N of the engine 25, the intake vacuum Vc is entirely independent of the engine crankshaft rotation speed N, and the relation therebetween varies incessantly depending on the operating condition of the engine 25. In the embodiment of the present invention, therefore, a plurality of data of the rate of opening $(t/T)_{VM}$ of the slow solenoid-operated valve 8 and main solenoid-operated valve 9 corresponding to the desired values of the A/F ratio in the various operating conditions of the engine 25 are mapped relative to the intake vacuum Vc and engine crankshaft rotation speed N, as illustrated in FIG. 13. These data are stored in the ROM 202 in the ECU 1. Of course, these stored data of $(t/T)_{VM}$ are determined considering the fact that the curve D in FIG. 12 represents the desired A/F ratio at a reference rate of valve opening which is, for example, 50%. On the basis of the intake vacuum Vc sensed by the vacuum sensor 10 and the engine rotation speed N sensed by the rotation sensor 12, the corresponding data of $(t/T)_{VM}$ stored in the ROM 202 is read out, and the ECU 1 determines the duty ratio t/T of the drive signal DSV or DMV on the basis of the data of $(t/T)_{VM}$ read out from the ROM 202.

Figure 14:
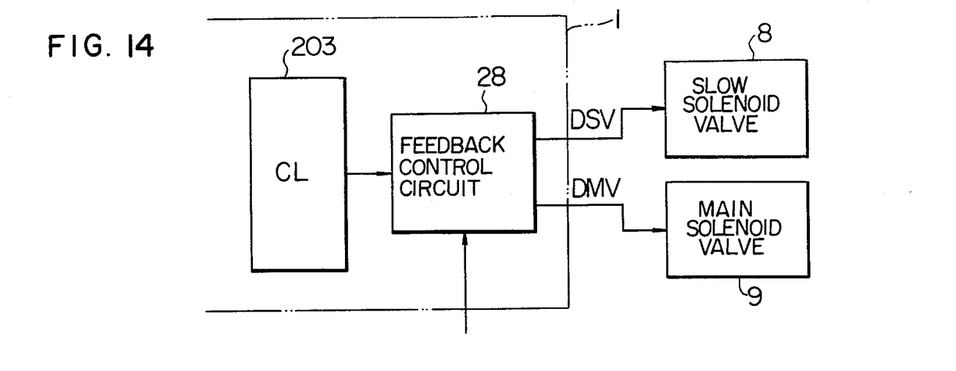
FIG. 14 is a block diagram of a circuit used for checking whether the feedback control on the basis of the output signal from the $O_2$ sensor is normally carried out or not.

The value of the A/F ratio in the steady operating condition must be selected to lie in the vicinity of 14.7 (λ=1) when a three-way catalyst is used to purify exhaust gases from the engine 25. To this end, the output signal from the O₂ sensor 3 is fed back to the slow solenoid-operated valve 8 or the main solenoid-operated valve 9 so as to control the solenoid-operated valve 8 or 9. In this case, it is necessary to check whether the feedback control is normally carried out or not. Since the level of the output signal from the O₂ sensor 3 makes a sharp stepwise variation at the A/F ratio ≈14.7 (λ=1), whether the feedback control is normally carried out or not can be checked by varying the value of the A/F ratio within a range including values larger and smaller than 14.7. It is assumed that $(t/T)_{VF}$ is a variation in the rate of opening of the solenoid-operated valve 8 or 9 for causing such a variation in the value of the A/F ratio. In an internal combustion engine of the fuel injection type in which a mapping of data of the rate of opening $(t/T)_{VM}$ of its fuel injection valves is stored in a memory element for the fuel control, $(t/T)_{VF}$ is generally expressed as a function of data of $(t/T)_{VM}$ stored in the memory element, that is, $(t/T)_{VF}$ is expressed as $(t/T)_{VF}=f\{(t/T)_{VM}\}$. However, in the engine having a carburetor under consideration, $(t/T)_{VM}$ is not always proportional to the engine rotation speed N or intake vacuum Vc under all the operating conditions of the engine, and $(t/T)_{VM}$ tends to vary depending on the setting of the carburetor 7. Also, $(t/T)_{VM}$ is not always the same for individual engines and tends to fluctuate depending on the amount of air taken into the engine. Thus, $(t/T)_{VF}$ may have an unnecessarily large value when it is determined as the function of $(t/T)_{VM}$, and this is undesirable from the viewpoint of exhaust gas purification. In order to obviate the above problem, the ECU 1 in the embodiment of the present invention includes a feedback control circuit 28 connected between the CL 203 and the slow and main solenoid-operated valves 8 and 9 as shown in FIG. 14. The data $(t/T)_{VM}$ corresponding to the sensed engine rotation speed N and sensed intake vacuum Vc among those mapped and stored in the ROM 202 is supplied through the CL 203 to the feedback circuit 28 to which the output signal Vo from the O₂ sensor 3 is also applied to be compared with a reference signal Vλ indicative of the A/F ratio=14.7 ($\lambda=1$), so that the actual valve opening rate $(t/T)_V$ can be determined according to the equation $(t/T)_V=(t/T)_{VM}\pm(t/T)_{VF}$. The value of $(t/T)_{VF}$ is so selected that the A/F ratio given by the equation $(t/T)_V=(t/T)_{VM}+(t/T)_{VF}$ becomes equal to 14.7 (that is, Vo=Vλ) when Vo−Vλ<0, and that the A/F ratio given by the equation $(t/T)_V=(t/T)_{VM}-(t/T)_{VF}$ becomes equal to 14.7 (that is, Vo=Vλ) when Vo−Vλ>0. The duty ratio t/T of the drive signal DSV or DMV is so determined as to provide the above rate of valve opening $(t/T)_V$ for the solenoid-operated valve 8 or 9.

Figure 15:
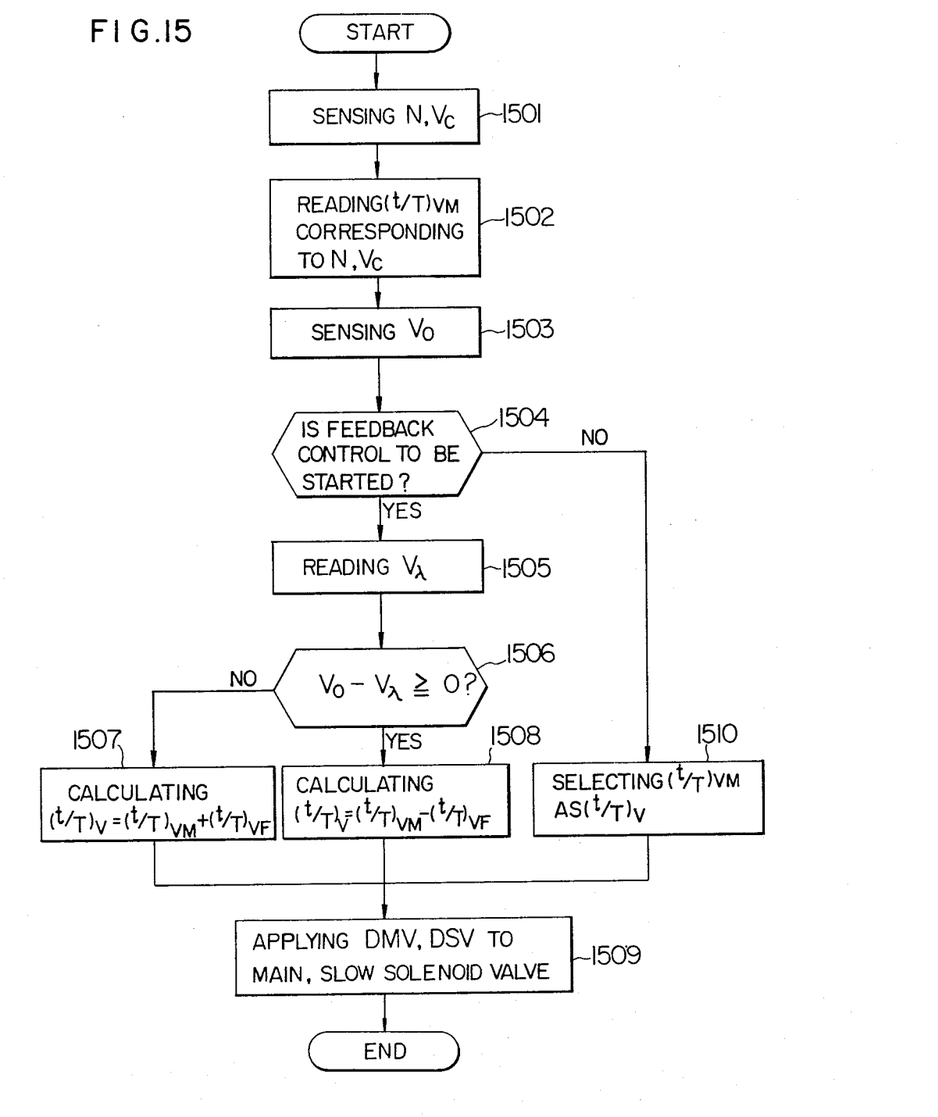
FIG. 15 is a flow chart for checking whether the feedback control on the basis of the output signal from the $O_2$ sensor is normally carried out or not.

The aforementioned control, in which the value of the A/F ratio is varied under the feedback control, will be described with reference to the flowchart shown in FIG. 15. In step 1501, the crankshaft rotation speed N of the engine 25 is sensed by the rotation sensor 12, and the vacuum Vc in the intake pipe 22 is sensed by the vacuum sensor 10. In step 1502, the rate of valve opening $(t/T)_{VM}$ corresponding to the sensed engine crankshaft rotation speed N and sensed intake vacuum Vc is read out from the ROM 202 storing the mapping of such data. In step 1503, the output signal Vo from the O₂ sensor 3 is detected, and in step 1504, a determination is made as to whether the feedback control on the basis of the output signal Vo from the O₂ sensor 3 is to be started or not. The factors required for the determination include the temperature of the O₂ sensor 3, the temperature Tw of the engine 25, and the level of the output signal Vo from the O₂ sensor 3, when so required. When it is determined that the feedback control is to be started in step 1504, the data of the reference signal Vλ indicative of the A/F ratio=14.7 ($\lambda=1$) is read out from the ROM 202 in step 1505. In step 1506, the O₂ sensor output signal Vo is compared with the reference signal Vλ. When Vo−Vλ<0, the actual rate of valve opening $(t/T)_V$ is determined according to the equation $(t/T)_V=(t/T)_{VM}+(t/T)_{VF}$ in step 1507, while when Vo−Vλ≧0, the actual rate of valve opening $(t/T)_V$ is determined according to the equation $(t/T)_V=(t/T)_{VM}-(t/T)_{VF}$ in step 1508. In step 1509, the duty ratio (t/T) of the drive signal DSV or DMV is selected to be equal to $(t/T)_V$ determined in step 1507 or 1508, and such a drive signal DSV or DMV is applied to the slow solenoid-operated valve 8 or the main solenoid-operated valve 9. When the result of determination in step 1504 indicates that the feedback control on the basis of the output signal Vo from the O₂ sensor 3 is not to be started, the actual rate of valve opening $(t/T)_V$ is selected to be $(t/T)_V=(t/T)_{VM}$ in step 1510.

It will be understood from the above description that, in the present invention, the A/F ratio in the steady operating condition is controlled by energizing the slow solenoid-operated valve 8 or the main solenoid-operated valve 9 whose rate of opening is determined relative to the sensed engine crankshaft rotation speed N and sensed intake vacuum Vc, while the A/F ratio in any one of the unsteady operating conditions is controlled by energizing the air bypass control solenoid-operated valve 4 and fuel bypass control solenoid-operated valve 6 whose rates of opening are determined relative to the sensed engine crankshaft rotation speed N, sensed intake vacuum Vc and sensed engine temperature Tw. That is, one of the A/F ratio control modes is selected on the basis of the engine crankshaft rotation speed N, the variation in the intake vacuum Vc and the engine temperature Tw and depending on whether the throttle valve is fully closed or not.

EGR CONTROL

Figures 16, 17, 18:
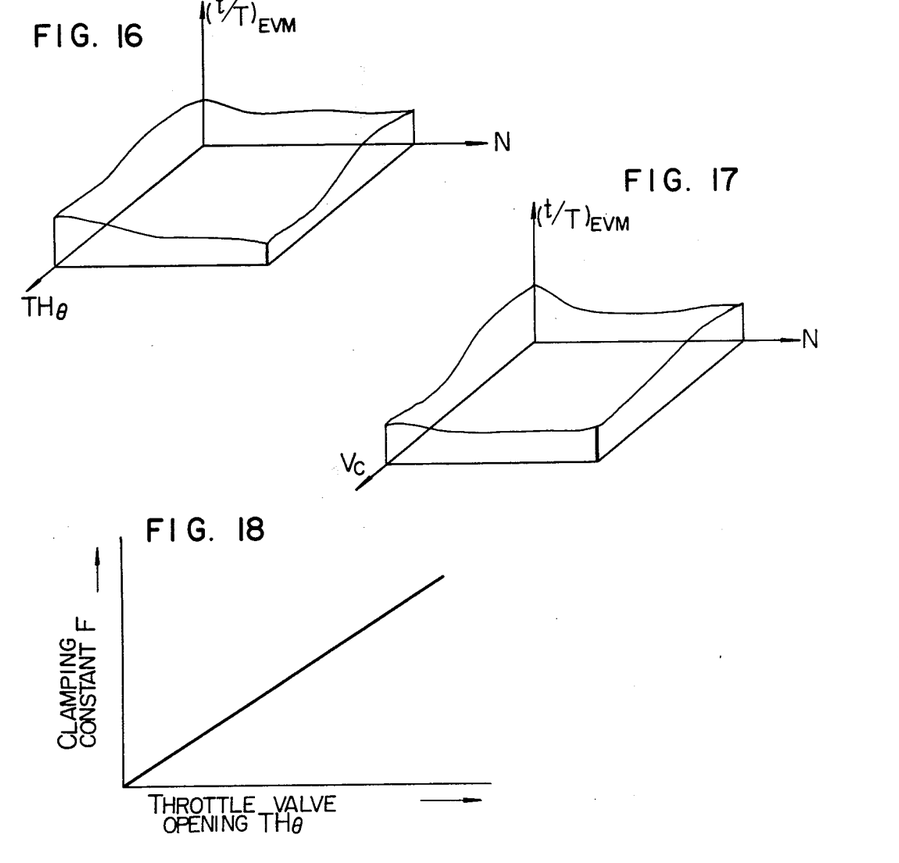
FIG. 16 is an illustration of the mapping of predetermined data indicative of the desired rate of opening of the EGR valve, relative to the rotation speed of the engine and the opening of the throttle valve.
FIG. 17 is an illustration of the mapping of predetermined data indicative of the desired rate of opening of the EGR valve, relative to the rotation speed of the engine and the vacuum in the intake pipe.
FIG. 18 is a graph showing the relationship between the clamping constant determining the upper limit and/or the lower limit of the rate of opening of the EGR valve and the opening of the throttle valve.

The control of the rate of exhaust gas recirculation will next be described. As in the case of the A/F ratio control in the steady operating condition, a mapping of the data of the rate of opening of the solenoid-operated valve 802 in the pressure control valve 16 is stored in the ROM 202 for the purpose of control of the rate of EGR. In the case of the A/F ratio control in the steady operating condition, the mapping of the data of the rate of opening of the slow solenoid-operated valve 8 and main solenoid-operated valve 9 relative to the engine rotation speed N and intake vacuum Vc is stored in the ROM 202, and the data corresponding to the sensed engine crankshaft rotation speed N and sensed intake vacuum Vc is read out for the A/F ratio control. In the case of the EGR rate control, however, a mapping of the data of the rate of EGR (that is, the rate of opening $(t/T)_{EV}$ of the solenoid-operated valve 802) relative to the engine cranksahft rotation speed N and intake vacuum Vc is not useful for the control, since the vaccum Vc in the intake pipe 22 varies generally depending on the rate of EGR, and a self-excited oscillation tends to occur in the EGR control resulting in impossibility of the desired control. Therefore, the data of the rate of EGR, that is, the data of the rate of opening $(t/T)_{EV}$ of the solenoid-operated valve 802, should be mapped relative to the engine crankshaft rotation speed N and throttle valve opening TH$_\theta$ which are not affected by the exhaust gas recirculation, as illustrated in FIG. 16. This obviates the problem of self-excited oscillation and other problems, and the rate of EGR can be accurately controlled. In another method as illustrated in FIG. 17, the data of the rate of EGR are mapped relative to the engine crankshaft rotation speed N and intake vacuum Vc, and the data read out from among the mapped data is clamped depending on the throttle valve opening TH$_\theta$. That is, the rate of EGR is expressed as a function given by F·f(N, Vc) where F=f(TH$_\theta$). The clamping constant F is proportional to the throttle valve opening $TH_\theta$ as shown in FIG. 18. According to experimental results, the rate of EGR has the tendency of hitching such that it increases in a diverging fashion and decreases also in a diverging fashion. It is therefore necessary that the clamping level should increase or decrease depending on the increase or decrease in the rate of EGR or has a predetermined range in both of these directions.

Figure 19:
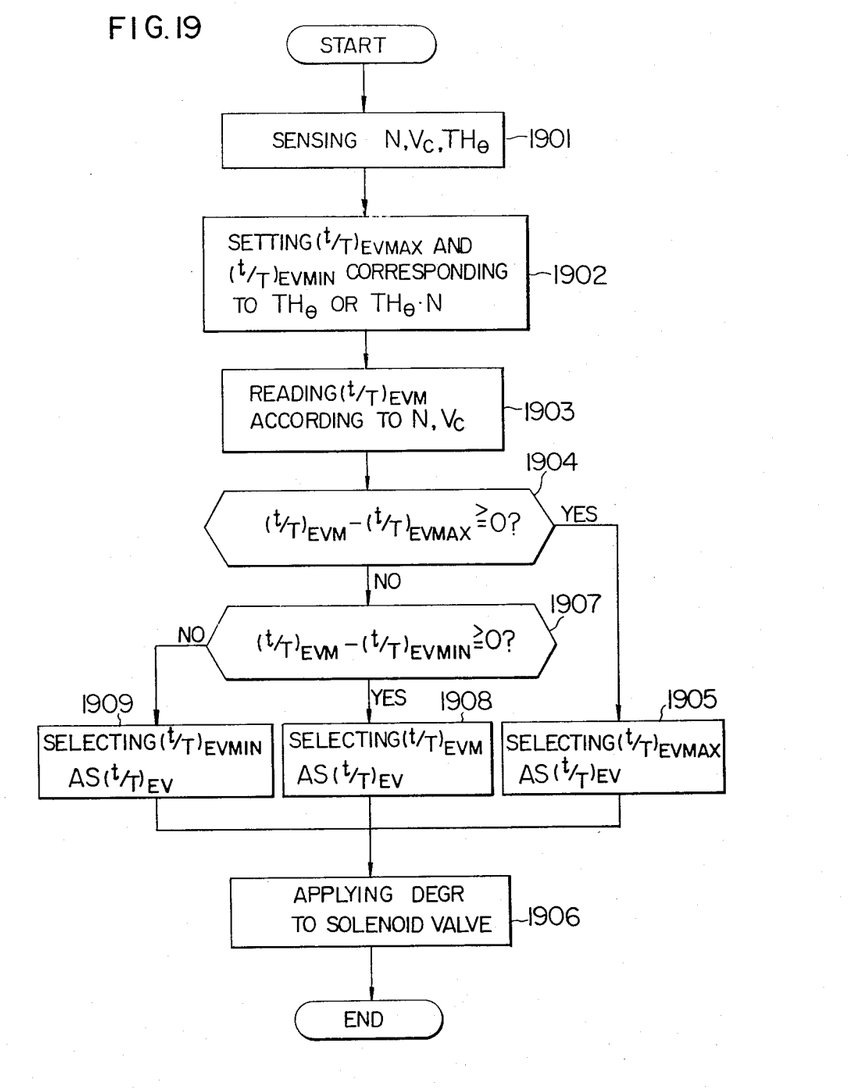
FIG. 19 is a flow chart of exhaust gas recirculation rate control.

The latter mode of EGR rate control will be described with reference to the flow chart shown in FIG. 19. In step 1901, the engine crankshaft rotation speed N, intake vacuum Vc and throttle valve opening $TH_\theta$ are sensed by the rotation sensor 12, vacuum sensor 10 and throttle sensor 15, respectively. In step 1902, a reference maximum rate of opening $(t/T)_{EVMAX}$ and a reference minimum rate of opening $(t/T)_{EVMIN}$ of the solenoid-operated valve 802 relative to $TH_\theta$ or $(TH_\theta \times N)$ are set. In step 1903, the rate of valve opening $(t/T)_{EVM}$ corresponding to the sensed engine crankshaft rotation speed N and sensed intake vacuum Vc is read out from the ROM 202 storing the mapping of the data. In step 1904, $(t/T)_{EVM}$ is compared with $(t/T)_{EVMAX}$. When $(t/T)_{EVM} - (t/T)_{EVMAX} \geq 0$, $(t/T)_{EVMAX}$ is selected as $(t/T)_{EV}$ in step 1905, and the drive signal DEGR having the duty ratio t/T corresponding to $(t/T)_{EVMAX}$ is applied to the solenoid-operated valve 802 in step 1906. When, on the other hand, $(t/T)_{EVM} - (t/T)_{EVMAX} < 0$, $(t/T)_{EVM}$ is compared with $(t/T)_{EVMIN}$ in step 1907. When $(t/T)_{EVM} - (t/T)_{EVMIN} \geq 0$, $(t/T)_{EVM}$ is selected as $(t/T)_{EV}$ in step 1908, and the drive signal DEGR having the duty ratio t/T corresponding to $(t/T)_{EVM}$ is applied to the solenoid-operated valve 802 in step 1906. Further, when $(t/T)_{EVM} - (t/T)_{EVMIN} < 0$, $(t/T)_{EVMIN}$ is selected as $(t/T)_{EV}$ in step 1909, and the drive signal DEGR having the duty ratio corresponding to $(t/T)_{EVMIN}$ is applied to the solenoid-operated valve 802 in step 1906.

The above controls of the A/F ratio in the steady operating condition, of the A/F ratio in the unsteady operating condition, and of the EGR rate are effected successively by successive application of starting signals for these controls to the ECU 1 with an interval of 20 ms, for example.

What we claim is:

1. A method of operating a processor-controlled apparatus for controlling the operation of an internal combustion engine having a carburetor through which the air-fuel ratio of the air-fuel mixture supplied to the engine is controlled, and a controlled exhaust gas recirculation path having an exhaust gas recirculation valve for controllably recirculating exhaust gas from an exhaust pipe of said engine to an intake pipe for said carburetor, comprising the steps of:

(a) storing, in memory, predetermined data defining prescribed operational control of said exhaust gas recirculation valve in accordance with prescribed engine operation conditions;

(b) in response to at least one preselected sensed engine operation condition, including the position of the throttle of said carburetor, setting a maximum limit and a minimum limit on said prescribed operational control of said exhaust gas recirculation valve, such that said maximum and minimum limits become larger as the opening degree of said throttle valve becomes larger;

(c) accessing from said memory data stored in step (a), based upon sensed engine operation conditions;

(d) generating control signals for controlling the operation of said controlled exhaust gas recirculation valve in accordance with a prescribed relationship between data accessed from said memory in step (c) and said maximum and minimum limits set in step (b), such that the duty ratio of opening of said exhaust gas recirculation valve is between said maximum and minimum limits;

(e) operating said controlled exhaust recirculation valve in accordance with the control signals generated in (d); and wherein step (d) comprises the steps of:

(d1) comparing data accessed from memory with said maximum limit set in step (b), and (d2) in response to the value of said accessed data exceeding said maximum limit, generating said control signals on the basis of said maximum limit.

2. A method according to claim 1, wherein said prescribed engine conditions comprises engine crankshaft speed and engine intake vacuum.

3. A method according to claim 1, wherein step (d) further comprises the steps of:

(d1) comparing data accessed from memory with said maximum limit set in step (b), (d2) in response to the value of said accessed data not exceeding said maximum limit, comparing said accessed data with said minimum limit set in step (b), and (d3) in response to the value of said accessed data being less than said minimum limit, generating said control signals on the basis of said minimum limit.

4. A method according to claim 1, wherein step (d) further comprises the steps of:

(d1) comparing data accessed from memory with said maximum limit set in step (b), (d2) in response to the value of said accessed data not exceeding said maximum limit, comparing said accessed data with said minimum limit set in step (b), and (d3) in response to the value of said minimum limit not exceeding said accessed data, generating said control signals on the basis of said accessed data.

* * * * *